Jan. 6, 1959        F. P. SCHMIDT        2,867,394

PULSE CONTROL OF PROGRAMMING DEVICE FOR AIRCRAFT

Filed May 26, 1954        3 Sheets-Sheet 1

INVENTOR.
FRANK P. SCHMIDT
BY
Charles L. Lorenchick
atty

Jan. 6, 1959  F. P. SCHMIDT  2,867,394
PULSE CONTROL OF PROGRAMMING DEVICE FOR AIRCRAFT
Filed May 26, 1954  3 Sheets-Sheet 2

*INVENTOR.*
FRANK P. SCHMIDT
BY

Jan. 6, 1959 F. P. SCHMIDT 2,867,394
PULSE CONTROL OF PROGRAMMING DEVICE FOR AIRCRAFT
Filed May 26, 1954 3 Sheets-Sheet 3
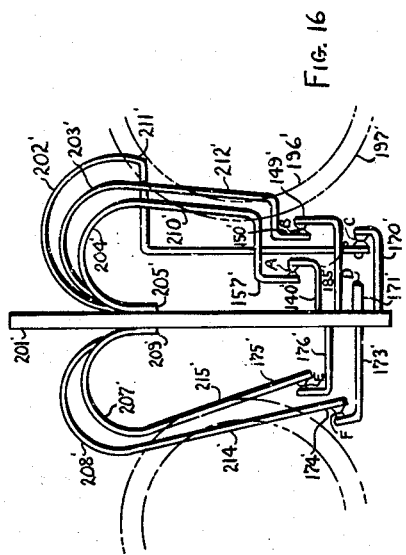
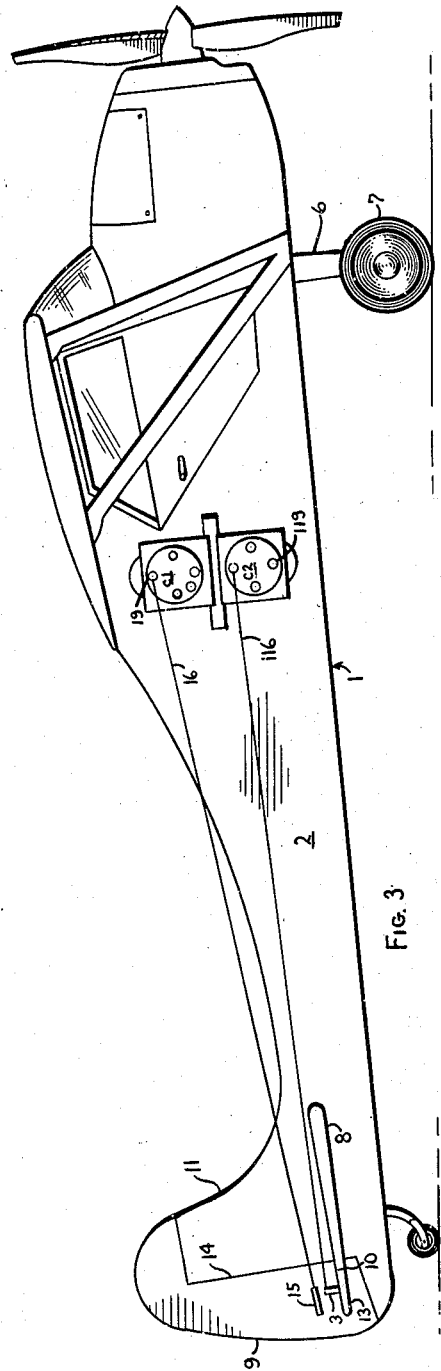
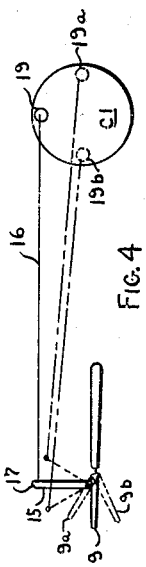
INVENTOR.
FRANK P. SCHMIDT
BY
Charles L. Lorensbish
attorney

United States Patent Office 2,867,394
Patented Jan. 6, 1959

2,867,394

PULSE CONTROL OF PROGRAMMING DEVICE FOR AIRCRAFT

Frank P. Schmidt, Erie, Pa.

Application May 26, 1954, Serial No. 432,490

7 Claims. (Cl. 244—77)

This invention relates to controls and more particularly to controls for model airplanes.

In the construction of controls for model airplanes, it has been common practice to provide controls which are elaborate in design and subject to operational difficulties and failures. When the controls failed, the plane would frequently go out of control resulting in damage to the plane and to persons nearby. I propose to provide a control for model airplanes made up of a motor and a relay, the control to be executed by a radio and the control to drive a control member on the airplane itself or on the device being controlled. The control is designed so that it will move the device being controlled to a neutral position at any time the operator discontinues all control signals. When the relay is held closed by radio signal or otherwise, the control is actuated and it will drive the control element to first position and when the relay is held open the motor will be driven to a neutral position. In case of a failure in the radio equipment or if the operator releases the controls, the motor will drive the control member to a neutral position. The motor causes two cam operated switches to function, each having a pole connected to one side of a motor and having the other pole of each switch connected to a pole of a double throw relay. The cams are so arranged that one said switch is operated by the cam driven by the motor and the control attached thereto. Although I disclose the control for use on model airplanes, it could be used for any remotely controllable vehicles or machines. It is also applicable to use on many types of apparatus where follow-up control is needed. In another form of my control I add a third contact operated by the motor driven cam. The third contact causes a second motor to control another function of a machine to be operated.

An object of my invention is to overcome the difficulties in prior controls for model airplanes and other controls and more specifically an object of the invention is to provide a control for model airplanes which is simple in construction, economical to manufacture, and efficient and substantially trouble free in use.

Another object of the invention is to provide a control that will put out a substantial amount of power to operate the device to be controlled.

Another object of my invention is to provide a control for model airplanes operated by moving an electric switch to one position thereby causing the control motor to drive the control element to one position and wherein rapidly opening and closing the switch will cause the control element to move past the first position to drive the control element to another position and wherein releasing the switch at any point will cause the control to drive the control element to a neutral position.

Another object of my invention is to provide an electrical follow-up system for operating an electric motor wherein the actuation of a switch will cause a motor on the control to drive in one direction on the device to be actuated to perform a control function and a second actuation of the switch will cause the control motor to continue to rotate to perform a second control function.

Another object of my invention is to provide a control for controlling two separate devices having a single electrical pulse source to actuate both devices.

A further object of my invention is to provide a control for a model airplane wherein opening and closing a single switch will actuate the control to move a plurality of control surfaces to a plurality of selected positions depending on the number of times the switch is opened and closed.

With the above and other objects in view, the present invention consists of the combination and arrangement of parts hereinafter more fully described, illustrated in the accompanying drawings, and more particularly pointed out in the appended claims, it being understood that changes may be made in the form, size, proportions, and minor details of construction without departing from the spirit or sacrificing any of the advantages of the invention.

In the drawings:

Fig. 3 is a side view of a model airplane having a control thereon;

Fig. 4 is a view of the mechanical linkages connecting the control to elements to be controlled;

Figure 1:
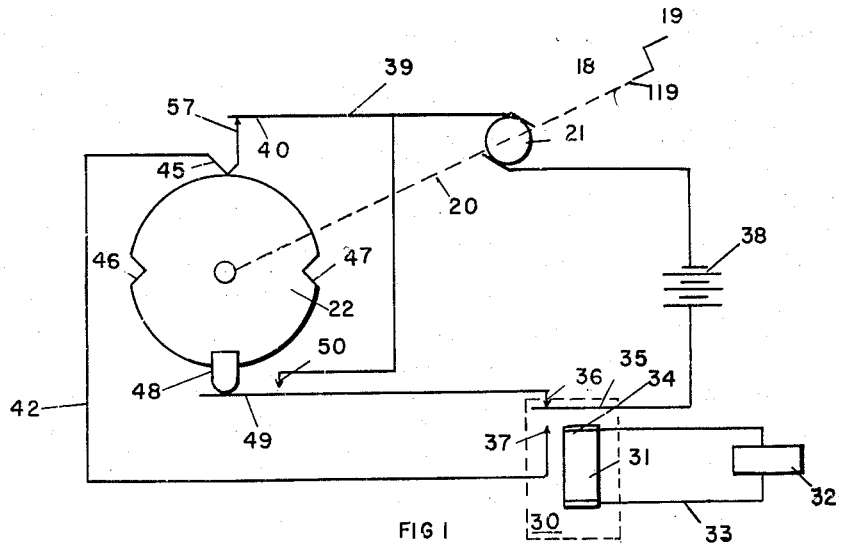
Fig. 1 is a wiring diagram of my invention showing the motor and cam members schematically thereon.

Figs. 8, 9, 10, 11, 12, 13, 14, and 15 show the cam operated contacts.

Fig. 16 is an enlarged view of the contact members that are operated by cams.

Now referring more specifically to the drawings, I show a model airplane 1 having a fuselage 2. The airplane fuselage is supported by struts 6 having wheels 7 thereon. The stabilizer 8 is attached to the rear end of the plane and the elevators 13 are pivotally connected thereto at 10. The movable rudder 9 is pivoted to the fixed rudder 11 at 14 and has lever 15 attached thereto. Other control elements of the plane may have similar levers to be operated by my control; however, the description of the control in this application of my invention will be directed toward the control of the rudder in the case of the two position control and to the rudder and elevator in the case of the three position control.

Figure 2:
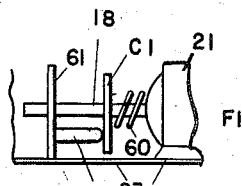
Fig. 2 is a view of the control showing a brake for stopping my control in a specific position.
Figure 8:
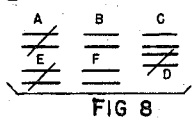
Figure 9:
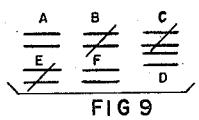
Figure 10:
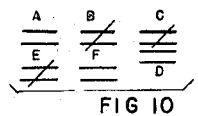
Figure 11:
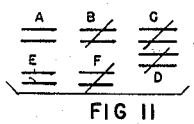
Figure 12:
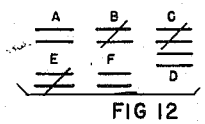
Figure 13:
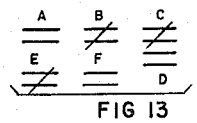
Figure 14:
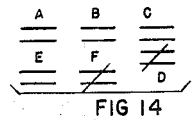
Figure 15:
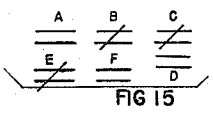

The rod 16 is pivotally attached to the lever 15 at 17 and is attached to a disk C1 at 19. The rod 116a is attached to C2 at 119. The disk C1 is mechanically driven by the shaft 18 of the motor 21 which likewise has a disk C2 attached thereto. The motor 21, the disk C2, and the crank 19 may be suitably mounted in a case such as case 23 shown in Fig. 2 and the case supported on an airplane or the motor and cam could be supported on platform 126. The relay 30 may also be mounted in the case 23. The solenoid 31 of the relay 30 is connected to the radio receiver 32 by means of wires 33. The receiver 32 may also be mounted on the airplane. The armature 35 of the relay 30 is magnetically attracted to the magnetic core 34 and contacts 36 and 37 are fixed to the relay frame. When the relay 30 is excited, that is when the radio receiver receives a pulse from a transmitter, it draws the armature 35 down to make contact with the fixed normally open contact 37, thereby completing a circuit through the motor 21.

With the control in neutral position as shown when relay 30 is energized, power flows from the battery 38 through the motor 21, wire 39, contact 57, wire 42, and the contact 37 causing the motor 21 to rotate the disk C1 moving crank pin 19 to 19a, moving the rudder 9 to pivot about point 14 to a first side position 9a. When the motor 21 drives disk C1 (schematically illustrated as cam 22 in Fig. 1) a part of a revolution and the detent 45 supporting the contact 57 drops into notch 46 contact 57 will open interrupting power to the motor 21 and the motor will be caused to stop. Notches 46, 47, 146, 147, and 247 may be regarded as cam means.

Cam 48 will have moved off of the lever 49, allowing the contact 50 to close. If relay 30 is then degenerized closing a circuit through contacts 36 and 50, motor 21 will again be excited and will drive cam 22 until cam 48 engages lever 49 to open it and again stop the motor 21 with the rudder 9 in neutral position as shown at 9.

If, instead of allowing relay 30 to remain de-energized, it had been again energized as soon as detent 45 moved out of notch 46 energizing it from the radio receiver 32 or otherwise contact 57 will again be closed, and the motor 21 will be excited through contacts 37 and 57 and will drive until detent 45 drops into notch 47 moving cam 22 180 degrees from one rudder position wherein detent 45 engaged notch 46 to the position where detent 45 engaged notch 47 could move a rudder connected thereto from a right position to left or otherwise. If relay 30 is at any time allowed to remain de-energized a period of time, either by a power failure or by the operator dropping the control, with the cam 22 or C1 and therefore the rudder 9 out of the neutral position, the control contacts 36 and 35 will close and a circuit will be established through contacts 36 and 50 and the motor 21 will drive the cam member 22 or C1 to a neutral position and the rudder 9 will be moved to a neutral position shown in full lines in Fig. 4 and cam 48 will open switch 49 stopping the motor 21. The circuit, therefore, provides a fail-safe feature because it will always drive the rudder back to a neutral position when the control relay 30 is de-energized.

In order to prevent the motor from coasting after power is interrupted thereto, a brake is provided. The brake shown operates on the principle that due to play in the motor bearings the armature may be forced sideways slightly when it is not magnetized, that is, when power is removed therefrom. The operation of the brake is as follows:

When the motor 21 is excited, magnetic force on the motor armature will pull the motor armature laterally into its magnetically balanced position to move disk or cam C1 out of engagement with brake 53 against the force of spring 60. When the armature of the motor is de-energized spring 60 will force the motor armature laterally to bring disk or cam C1 into engagement with the brake element 53. Brake 53 is held to fixed member 61. The spring 60 applies a force between disk or cam C1 and the motor frame 21 and urges disk or cam C1 laterally toward brake 53. When power is again applied to the motor 21, the magnetism of the fields will pull the armature into magnetic center, compressing the spring 60 and pulling the armature into magnetic center and the disk or cam C1 out of engagement with the brake 53 to release the brake 53.

The control for the elevator 13 and other control elements may be similar to the one described in detail for the rudder.

Figure 7:
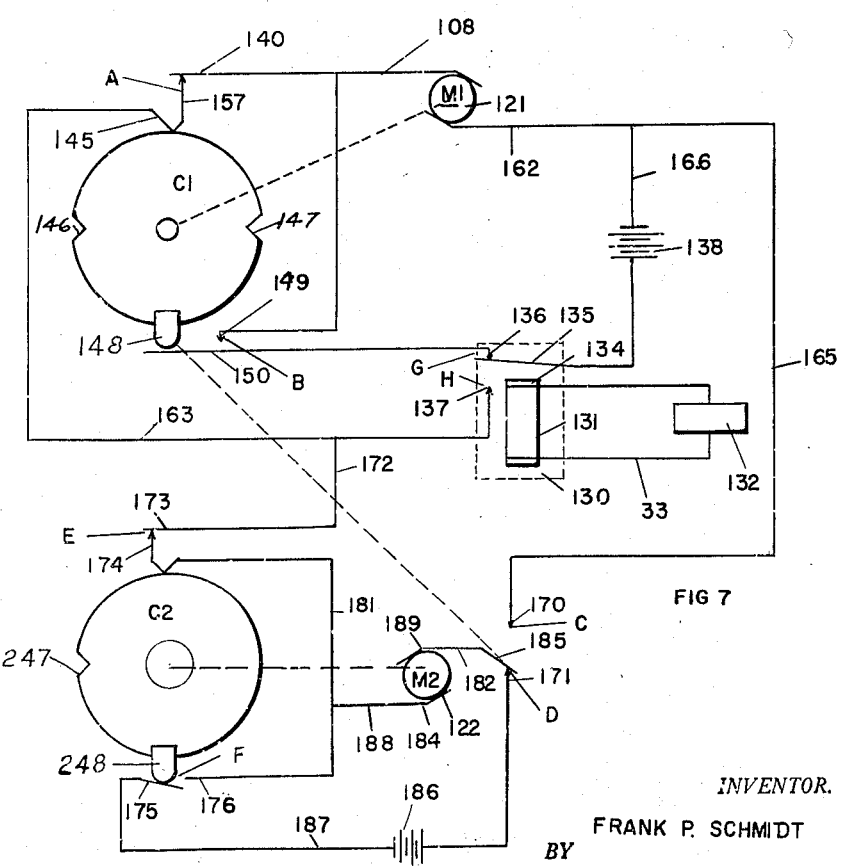
Fig. 7 is another embodiment of the invention showing the electrical circuit which may be used in combination with the cams shown in the figure and the plane shown in Fig. 3.
Figure 6:
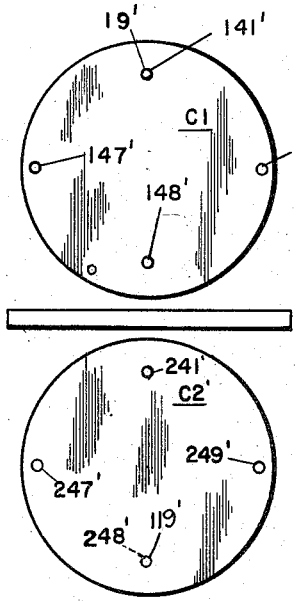
Fig. 6 is a side view of the device shown in Fig. 5.
Figure 5:
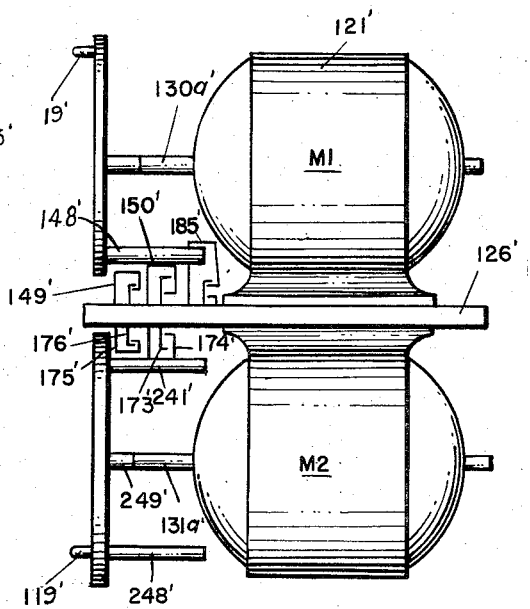
Fig. 5 is another view of a modified control including an additional circuit element not used in the control shown in Fig. 1 to control an additional element with one signal source.

In the embodiments of the invention shown in Figs. 5 and 6, the circuit shown in Fig. 7 is used; however, another embodiment of cams is used. The parts of the cams and switches in Figs. 5 and 6 corresponding to the parts shown in Fig. 7 are numbered similarly with a (') added thereto. I disclose a signal system for controlling two separate airplane or machine elements, for example, a rudder and an elevator, each to two or more positions the control to operate from one signal source. The control system is made up of the two motors M1' and M2' also numbered 121' and 122'. The motor 121' drives the disk or cam C1' through shaft 130a' and the motor 122' drives the disk C2' through shaft 131a'. In Fig. 7, cams C1 and C2 are disks having cam notches 247, 146, and 147 formed in the periphery as shown and with cams 148 and 248 attached to the sides of the respective cam wheels and projecting outward from the periphery. The cam members 146', 147', 148', and 149' are in the form of laterally extending pins attached to the disk C1'. Pins 146', 147', 247', and 241', being short, overlie only switches 149' and 175'. The cam members 241', 247', 248', and 249' are laterally extending pins attached to disk C2'. The followers are made of relatively thin sheets of flexible metal bent in the form shown and having the circuit wiring connected thereto. The follower 149' is engaged by cam members 146' and 147' as they rotate with disk C1'. Followers 150' and 185' are engaged by cam member 148'. Cam members 146' and 147' travel through path 197' and cam 148' travels through path 196'. While cam 148' overlies switches 150' and 185', pins 241' and 248' overlie followers 175' and 174'. Pin 148', being closer to the center of disk C1', clears switch 149' as it rotates but engages followers 150' and 185' since followers 150' and 185' project up higher. Likewise, pins 241' and 248' clear follower 175' as they rotate but since follower 174' is up higher, they engage it.

Fig. 16 shows a side view of the said cam followers and the path of cam pins 146'–148', 241' and 247'–249' showing how the path 196' of pin 148' first engages and opens switch B and then moves off it onto 211', allowing pin 148' to close and open switches C and D. Switches A, B, C, E, and F are closed when the followers are not engaged by their respective cams 146', 147', 148', 149', 241', 247', 248', or 249'. The contact D is open when arm 211' is not engaged by a cam.

The cam wheels C1 and C2 shown in Fig. 7 correspond to cam wheels C1' and C2' shown in Figs. 5 and 6. Cam surfaces or notches 146, 147, and 247 correspond to cam pins 146', 147', and 247' shown in Figs. 5 and 6. Also, cams 148 and 248 correspond to long pins 148' and 248' shown in Figs. 5 and 6. Switches shown in Figs. 5 and 6 are numbered with the same numbers as the corresponding switches in Fig. 7 with (') added thereto. The wiring of the circuit used with the switches shown in Figs. 5 and 6 is identical to that shown in Fig. 7 and the operation of the two circuits is identical. Figs. 5 and 6, however, show an alternative method of constructing the contacts and the cams to operate the contacts.

The contacts 135, 136, and 137 are the contacts on a double pole relay 130 which is controlled by the solenoid 131. The solenoid 131 is excited from a radio receiver 132 which is in turn operated by a radio transmitter mounted at a distance therefrom. The relay 130 could be actuated by a switch and power supply connected in series with the solenoid 131 or it could be actuated manually by controlling the movable contact 135 thereof similar to the circuit shown in Fig. 1.

The circuit shown in Fig. 7 has the components thereof that correspond to the circuit shown in Fig. 1 similarly numbered with the addition of 100 to each number.

Wire 172 is connected to the wire 163 between follower 157 and contact 137 and, at the other end thereof, is connected to the contact 173. The follower 174 is connected to contact 176 through wire 181 and through wire 188 to the terminal 184 of motor M1. The terminal 189 of motor M1 is connected through wire 182 to the follower 185. When cam 148 engages follower 185 it breaks contact with contact 171 and completes a circuit through the contact 170 to the wire 165 and battery terminal 166. When in the position shown, not engaged by a cam follower 185 completes a circuit through contact 171 to the battery 186. The other side of the battery 186 is connected through wire 187 to the follower 175 which is normally open and, when closed, engages the contact 176.

During operation, it will be seen that when no signal is applied, the relay solenoid 131 will be de-energized and the switches A, B, C, D, E and F will be in the positions shown. That is switches A, E, D, and G will be closed and B, C, F, and H will be open. As long as relay 130 is de-energized battery 138 will drive motor M1 until the cam 148 opens switch A which will bring disk C1 and the rudder connected thereto to the neutral position. Likewise battery 186 will drive M2 until cam 241 or 248 opens switch F. This will be a neutral position of the elevator.

In operation with the circuit in a neutral position as shown if the relay 130 is actuated by one pulse from radio receiver 132, the contacts 135 and 137 will close. This will complete a circuit from the battery terminal through contact 135 and 137, wires 163, follower 157 and contact 140 to motor wire 108 through the motor M1 to wire 162 through wires 166 and battery 138 back to terminal 166. This will cause motor 121 to drive until the cam 146 leaves follower 150 allowing it to close until the contact 149 actuates the follower 157 to open it, thereby stopping the motor 121. If the relay contact 135 is then allowed to close to 136 by de-energizing solenoid 131 the contact 136 will close and the motor 121 will then drive the cam C1 to a neutral position. This may be the second position of a rudder of a model airplane, for example, or it could be the second position of any other element to be controlled. If the relay 130 is then allowed to open to connect contacts 135 and 136 again, current will again flow through contacts 135, 136, 150 and 149 to drive the motor 121 and disk C1 attached thereto to move the cam member 147 out of engagement with the contacts to allow them to close again so that the motor 121 will again drive around until the came 146 thereof again actuates the follower 157 to move it to open position. This process of keying the radio or feeding pulses to the relay may continue until the cam member 148 rotates to position to engage the follower 185 to close the contact between 185 and 171 and to open a circuit between 185 and 170. Since cam member 146 is spaced a short distance ahead of 148 the follower 157 will be held open by cam member 146. Then current will flow from the battery 138 through a circuit made up of terminal 166, contacts 170 and 185 through the motor M2 and through the contacts 173 and 174 back through the contacts 137 and 135 to the battery to cause the motor M2 to drive until cam member 247 engages follower 174 to open it and stop motor M2. The motor M2 is connected by means of a link 119 to a control surface, for example, the elevators of an airplane or to some other control surface.

The positions of the various cam operated follower switches for various numbers of pulses are shown in the Table I below. In Table I contacts 157—140; 149—150; 185—171, 170—185, 175—176; and 173—174 are designated A, B, C, D, F, and E respectively. The following table designates the position of each contact when the relay 130 has been closed the indicated number of times or cycles and is held closed after the last cycle. The corresponding position of the rudder and elevator of a model airplane is indicated by way of illustration. The operation would be the same to control other machine elements.

In the foregoing specification, I have set forth the invention in its preferred practical forms but I am aware that the structure shown is capable of modification within a range of equivalents without departing from the invention which is to be understood is broadly novel as is commensurate with the appended claims.

The embodiments of the invention in which an exclusive property or privilege is claimed are defined as follows:

1. A device having a control member movable to a neutral position, a first position, and a second position comprising a motor operatively connected to said control member to move said control member to said positions, a source of power for said motor, a first switch and a second switch each completing a circuit to said motor when closed, a selector switch connecting said first switch to said power source when said selector switch is actuated and connecting said second switch to said source of power when said selector switch is actuated, actuating means actuating said selector switch in a first position and de-actuating said selector switch when in de-actuated position, cam means on said control member, said cam means closing said second switch to connect said motor through said second switch and said selector switch to drive said motor and thereby said cam means to return said control member to neutral position when said selector switch is deactuated, and spaced cam means on said control member to open said first switch at predetermined positions of said control member to disconnect said motor from said power source when said selector switch is in actuated position, said motor being connected to said power source by said second switch and said selector switch when said control member is not in one of said plurality of positions and said selector switch is actuated, said motor being connected to said power source through said second switch and said selector switch when said selector switch is de-actuated whereby said motor will drive said control member to said neutral position when said selector switch is in de-actuated position.

2. A device for controlling the rudder of a machine, said device comprising a rudder control member movable to a neutral position, a first, and a second position, a motor operatively connected to said rudder to move said rudder control member to said positions, a source of power for said motor, means to control said motor, actuating means for said control means, and means on said control means to selectively operate said motor to drive said rudder control member to said first position when said actuating means is first actuated, to said second position when said control means is de-actuated, and re-actuated within a predetermined time, said control means driving said rudder control member to neutral position when said actuating means remains de-actuated a predetermined time.

*Table I*

| Cycle No. of relay | Rudder | Elevator | No. of times relay 130 closed and held | A | B | C | D | E | F | Cam down | |
|---|---|---|---|---|---|---|---|---|---|---|---|
| | | | | | | | | | | C1 | C2 |
| 1 | Neutral | Neutral | 0 | C | O | C | O | C | O | 148 | 241 |
| 2 | Right | do | 1 | O | C | C | O | C | O | 149 | 241 |
| 3 | Left | do | 2 | O | C | C | O | C | O | 147 | 241 |
| 4 | do | Up | 3 | O | C | O | C | O | C | 146 | 247 |
| 5 | Right | Neutral | 4 | O | C | C | O | C | O | 149 | 248 |
| 6 | Left | do | 5 | O | C | C | O | C | O | 147 | 241 |
| 7 | do | Down | 6 | O | C | O | C | O | C | 146 | 249 |

Note.—Under A, B, C, D, E, and F in table, C means closed and O means open.

3. The device recited in claim 2 wherein a second control means is provided having a second motor actuated by said second control means to stop and start said motor along with said first motor.

4. In combination, a model airplane having a control member for controlling the direction of flight thereof and means to control said control member, said means comprising a motor operatively connected to said control member, an electrical circuit to control said motor, said circuit comprising a source of electrical power, switching means having a relay to connect said source of power to said motor, radio receiver means to actuate said switching means, said switching means driving said motor to move said control member from a neutral position to a first position to control said airplane in a first direction when said relay is closed and is held closed, said motor being energized by said circuit and driving said control member through said first position through neutral to a second position to control said airplane in a second direction when said relay is closed, then opened, and promptly reclosed and held closed a second time by said radio receiver means, said motor returning said control member to neutral when said relay is allowed to remain open, said circuit comprising a second motor and said airplane having a second control member operatively connected to said second motor, said second motor being controlled by the position of said first motor driving said second control member to a predetermined position when said first control member is driven from neutral and driving said second control member to neutral when said first motor has driven said first control member to neutral.

5. A control for a model airplane comprising an electric motor, a cam means driven by said motor, means to connect said cam means to a control element of a model airplane, a source of electrical power, a first circuit, a second circuit, a selector switch, said selector switch connecting said first circuit to said source of power when said selector switch is actuated, said first circuit including a first switch connected therein, said first switch having opening means actuated by said cam means when said cam means is in any one of a plurality of predetermined positions away from neutral and closing said first switch in all other positions of said cam means whereby said motor is connected to said source of power through said first switch and said selector switch when said cam means is away from said predetermined positions when said selector switch is closed, and a second switch, said second switch having means actuated by said cam means closing said second switch at all positions of said cam means away from said neutral position and completing said second circuit through said selector switch and said second switch when said selector switch is deactuated whereby said cam means and said means to connect said cam means to said control element are driven toward said neutral position when said control element is at any position away from neutral position.

6. The control recited in claim 5 wherein said means to actuate said selector switch is a solenoid, a radio receiver is connected to said solenoid, and means on said receiver to actuate said solenoid when a pulse is received by said receiver from a transmitter.

7. In combination, a vehicle for traversing a fluid medium and a control supported on said vehicle, said control comprising a motor, a cam means driven by said motor, means to connect said cam means to the rudder of said vehicle, a source of electrical power, a first circuit, a second circuit, a selector switch, said selector switch connecting said first circuit to said source of power when said selector switch is actuated, said first circuit including a first switch connected therein, said first switch having opening means actuated by said cam means when said cam means is in any one of a plurality of predetermined positions away from neutral and closing said first switch in all other positions of said cam means whereby said motor is connected to said source of power through said first switch and said selector switch when said cam means is away from said predetermined positions whereby said motor is driven toward one said predetermined position when said selector switch is closed, and a second switch, said second switch having means actuated by said cam means closing said second switch at all positions of said cam means away from said neutral position and completing said second circuit through said selector switch and said second switch when said selector switch is deactuated whereby said cam means and said means to connect said cam means to the rudder of said vehicle are driven toward said neutral position when said control is at any position away from neutral position.

References Cited in the file of this patent

UNITED STATES PATENTS

| | | |
|---|---|---|
| 2,107,472 | Denison | Feb. 8, 1938 |
| 2,195,859 | Gent | Apr. 2, 1940 |
| 2,253,654 | Schroder | Aug. 26, 1941 |
| 2,397,477 | Kellogg | Apr. 2, 1946 |
| 2,420,693 | White | May 20, 1947 |
| 2,543,789 | MacMillan | Mar. 6, 1951 |
| 2,637,431 | Harris | May 5, 1953 |
| 2,676,289 | Wulfsberg | Apr. 20, 1954 |
| 2,769,941 | Elliott | Nov. 6, 1956 |
| 2,782,271 | Jordan | Feb. 19, 1957 |

OTHER REFERENCES

Hull & Bourne: Radio Control of Model Aircraft, Radio Digest for November 1937, pages 35 to 42, photo in 250-2.21.